United States Patent
Simmons

[11] 3,827,040
[45] July 30, 1974

[54] SAFETY REMINDER SYSTEM FOR POWER MACHINES
[75] Inventor: Charles Clair Simmons, Tulsa, Okla.
[73] Assignee: Auto Crane Company, Tulsa, Okla.
[22] Filed: Jan. 16, 1973
[21] Appl. No.: 324,208

[52] U.S. Cl...... 340/267 R, 192/129 A, 317/135 R, 340/279
[51] Int. Cl. .......................................... G08b 21/00
[58] Field of Search........ 340/267 R, 279, 421, 272; 192/129 A; 317/135 R; 307/113, 116

[56] References Cited
UNITED STATES PATENTS

| | | | |
|---|---|---|---|
| 2,466,355 | 4/1949 | Baker............................. | 192/129 A |
| 2,783,327 | 2/1957 | Luckey............................. | 340/272 |
| 2,786,989 | 3/1957 | Smith, Jr........................ | 317/135 R |
| 3,493,780 | 2/1970 | Wiggs et al. ..................... | 340/272 |
| 3,730,296 | 5/1973 | Huigens............................ | 340/267 |

Primary Examiner—John W. Caldwell
Assistant Examiner—Glen R. Swann, III
Attorney, Agent, or Firm—William S. Dorman

[57] ABSTRACT

A safety equipment system for operators of power machines comprising an operator's safety equipment holder located adjacent to the power machine and a safety equipment switch carried by the equipment holder. The safety equipment holder includes a switch operator arm extending outwardly from the equipment holder for attaching the safety equipment thereto. When the safety equipment is supported on the operator arm, the operator arm will engage the safety equipment switch to hold the same in an open position; conversely removal of the safety equipment from the operator arm will cause the safety equipment switch to close. A safety floor mat is located at the operator's position adjacent to the power machine, and a mat switch is carried by the floor mat and operable by the operator standing thereon. A machine power switch is carried by the machine and operably connected to the machine through the equipment switch and the mat switch whereby activation of the equipment switch and mat switch is necessary before power is applied to the machine. An equipment use reminder lamp is disposed on the equipment holder and operably connected to the power switch through the equipment switch. An alarm is disposed adjacent to the power machine and operably connected to the power switch through the equipment switch and the mat switch whereby, upon closing the power switch, the equipment use reminder lamp is activated, and upon activating the mat switching means, the alarm is activated, if the safety equipment has not been removed from the operator arm.

6 Claims, 2 Drawing Figures

PATENTED JUL 30 1974　　　　　　　　　　3,827,040

SAFETY REMINDER SYSTEM FOR POWER MACHINES

BACKGROUND OF THE INVENTION

1. Field of the Invention

This invention relates to safety equipment reminder systems for use in conjunction with power machinery and more particularly, but not by way of limitation, to a safety system for power machines which requires the positive act of removing safety equipment from its holder, of the operator positioning himself in the correct machine operating position and a power switch being thrown before power is supplied to the machinery. The safety equipment reminder system also provides visual and audible reminder means to ensure that the power machine operator is reminded to use his available safety equipment.

2. Description of Prior Art

Heretofore, some power machines have been provided with safety devices such as hinged safety guards used in conjunction with grinding wheels and the like which employs a power interruption switch which can be activated only if the safety guard is positioned into place. Other safety devices have included a switch which is activated by the torso or body of the operator when he is in the proper position in relation to the machine for operation thereof.

However, these type safety devices have certain disadvantages in that first, the operation of some power machines do lend themselves to the use of machine mounted safety equipment in that some machines specifically require the use of personal equipment such as safety goggles, aprons, insulated gloves and the like. Secondly, in order to activate and keep depressed a torso or body operated switch causes the operator of the machine to constantly direct his attention to keeping the switch depressed thereby not allowing him to concentrate totally on the job at hand which thereby creates a secondary safety hazard in itself.

Other devices such as safety check lists are often ignored by the operator who is familar with the machine operation during a rush period.

SUMMARY OF THE INVENTION

The present invention contemplates a novel safety system for power machines designed and constructed for overcoming the above disadvantages. The present system includes a holder for safety equipment which is operably connected with the main power switch for the machine in order to prevent power being applied to the machine until the safety equipment has been removed from its holder. This safety equipment holder has also been provided with a visual display reminder to the operator to use the appropriate equipment.

The system is also provided with a machine power interlock located in a platform or pad disposed in front of the machine at a proper operator location with respect to the machine so that again, power may not be applied to the machine unless the operator is in his proper position with respect to the machine. This ensures that the operator will be in the proper location to operate the machine and at the same time allowing him to direct his full attention to the work being performed on the machine itself. This system is also provided with an alarm which may consist of a buzzer, a bell or the like, which will sound if the operator is in his proper working position with respect to the machine, has the main power switch of the machine turned on but has not removed his safety equipment from the equipment holder. This alarm system has a twofold purpose in that if the safety equipment power interlock were to fail thereby allowing power to be applied to the machine, the alarm would warn the operator that he should use his safety equipment. However, if the safety equipment holder power interlock is in operation, power will not be applied to the machine and the sound of the alarm will serve to embarass the negligent machine operator in front of his fellow employees and his supervisor. The typical operation of the machine would be as follows:

When the machine operator approaches his machine and switches the main power switch on, the reminder light on the equipment holder would be activated thereby reminding the worker to use his safety equipment. When the worker removes his safety equipment from the holder, the visual reminder light on the holder would be deactivated and the alarm means would be disabled. Then when the operator steps into his proper operating position on the mat or platform adjacent to the machine, power would be applied to the machine and as long as he stays in this proper operating position power would remain at the machine.

DESCRIPTION OF THE DRAWINGS

Other and further advantageous features of the present invention will more fully appear in connection with a detailed description of the drawings in which.

DETAILED DESCRIPTION OF THE INVENTION

Figure 1:
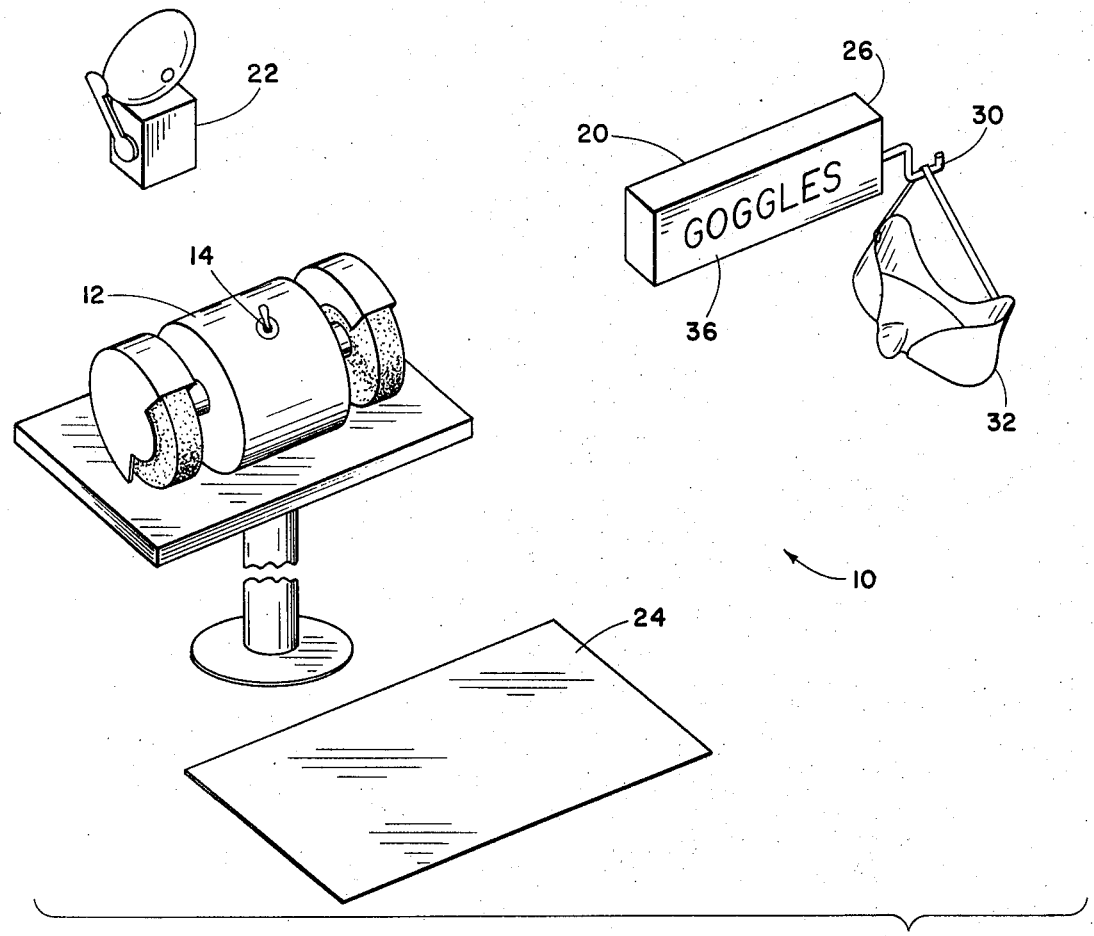
FIG. 1 is a perspective view of a power machine equipped with a safety reminder system embodying the present invention.

Referring to the drawings in detail reference character 10 generally indicates a safety equipment reminder system for operators of power machines comprising a power machine 12 which in this case is shown as an electric grinding machine. However, it is noted that this may be any type of power machine such as a drill press, lathe, planing machine, etc. The power machine 12 is provided with a main power switch 14 which may be located on or adjacent to the machine with one side of the switch 14 being operably connected to an ordinary AC outlet 16 by use of a conventional plug generally indicated by reference character 18.

The system 10 also comprises a safety equipment holder 20 which is disposed in a readily accessible place adjacent to the power machine 12 and an alarm means 22 also disposed adjacent to the power machine 12. An operator platform floor mat 24 is disposed on the floor adjacent to the power machine 12 and located in the proper machine operator position in relation to the machine 12.

The safety equipment holder 20 comprises a wall bracket or housing 26 which may be secured to the wall adjacent to the machine or to the power machine itself. A spring loaded switch 28 is carried by the housing 26, the said switch having an operator arm 30 extending outwardly from the said housing 26 for carrying safety goggles 32 or other safety equipment thereon. The switch 28 is adjusted so that the switch will be open whenever the safety equipment 32 is disposed on the extended operator arm 30. When the safety equipment 32 is removed therefrom, the operator arm 30 will move upwardly to a closed position for a purpose that will be hereinafter set forth. The housing 26 is also provided with a visual warning display lamp 34 which will when turned on, illuminate a display panel 36 provided on the front face of the bracket or housing 26.

A normally open spring loaded switch 38 is disposed within the platform or floor mat 24 so that when the machine operator steps onto the platform 24, the said switch 38 will be closed for a purpose that will be hereinafter set forth.

Figure 2:
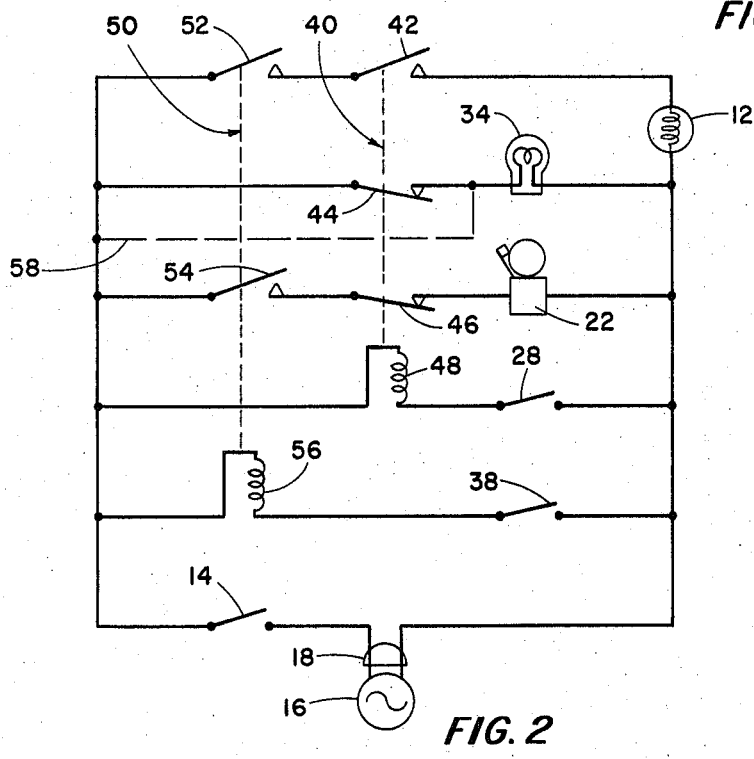
FIG. 2 is an electrical circuit diagram of the safety reminder system of FIG. 1.

Referring now to FIG. 2, reference character 40 generally indicates a three-switch relay comprising a first normally open switch 42 which is connected directly to the power machine 12 and in series with the main power switch 14. The second normally closed switch 44 which is operably connected between the visual reminder lamp 34 and the power switch 14 and a third normally closed switch 46 is operably connected between the alarm means 22 and the power switch 14. The relay 40 also comprises an operating coil means 48 which is connected directly to the spring loaded safety equipment switch 28.

A second two-switch relay 50 comprises a first normally open switch 52 which is operably connected between the switch 42 of the relay 40 and the power switch 14 and a second normally open switch 54 which is operably connected in series between the normally closed switch 46 of the relay 40 and the power switch 14. The relay 50 also comprises an operating relay coil 56 which is directly connected to the spring loaded mat switch 38 and to the power source 16 through the power switch 14.

When the power machine 12 is not in use, the power switch 14 is open and the safety equipment 32 is attached to the operator arm 30 of the spring loaded switch 28 thereby holding the said switch 28 in an open position. Also when no one is standing on the floor platform or mat 24 the spring loaded switch 38 is also in an open position and the power machine is completely disabled. Therefore, when the machine is not in use, the switch 42 will be in an open position, the switch 44 in a closed position and the switch 46 in a closed position. The switches 52 and 54 will also be in an open position thereby disabling the visual reminder means 34 and the alarm means 22.

If an operator approaches the machine at this point and closes the power switch 14 the safety equipment reminder lamp 34 will be activated thereby providing a visual display reminder at the panel 36. If at this point the machine operator steps onto the mat 24 thereby closing the switch 38 and energizing the relay 50, the alarm means 22 will be activated thereby providing audial alarm again reminding the operator to utilize his safety equipment. However, it is noted that since the safety equipment is still attached to the operator arm 30 of the switch 28, the relay 40 will still be unenergized thereby disabling the power machine 12. At this point the power machine 12 cannot be provided with power until the safety equipment 32 has been physically removed from the operator arm 30 of the switch 28.

If the machine operator upon approaching the machine 12 when it is not in use closes the switch 14 thereby energizing the reminder lamp 34, then removes the safety equipment from the operator arm 30 of the switch 28, he thereby disables the reminder lamp 34 and the alarm means 22. Then when the operator steps into position on the mat 24 thereby closing the switch 38 and energizing the relay 50, power is applied to the power machine for subsequent operation thereof.

The ideal procedure would be for the operator upon approaching the power machine 12 to remove the safety equipment 32 from its holder 20 thereby energizing the relay 40 which disables the lamp 34, the alarm 22 and closes the switch 42. Then when the operator steps into operating position on the mat 24 he energizes the relay 50 thereby closing the switches 52 and 54 which allows him to provide power to the machine 12 by simply closing the power switch 14.

It is readily apparent that the above safety features may be accomplished by various circuits other than the ones shown herein. For example, the reminder lamp 34 may be wired directly to the power switch 14 as shown by the broken line 58 of FIG. 2 to provide a constant reminder illumination at all times when the power switch is closed. It is also readily apparent that the relays 40 and 50 could be eliminated by the use of ganged switching in both the equipment holder 20 and the mat 24.

It is further noted that the illumination means 34 with visual display panel 36 may be modified to provide a blinking light or the like for a more efficient reminder whereas the alarm 22 may comprise an alarm bell system as depicted in FIG. 1, a simple buzzer, or the like.

From the foregoing it will be readily apparent that the present invention provides a safety reminder system for power machines which is particularly designed and constructed to provide more than adequate reminder to the operator to utilize his safety equipment and also provides a fail safe system to disable the power machine until some positive action has been taken toward the use of the safety equipment provided.

The novel safety equipment reminder system is simple and efficient in operation and economical and reliable in construction.

Whereas the present invention has been described in particular relation to the drawings attached hereto, it should be understood that other and further modifications, apart from those shown or suggested herein, may be made within the spirit and scope of this invention.

What is claimed is:

1. A safety equipment reminder system for operators of power machines and comprising operator safety equipment holder located adjacent to the power machine, safety equipment switching means carried by the equipment holder and engageable by the safety equipment, said safety equipment switching means being actuated by the removal of the safety equipment from the equipment holder, safety floor mat located at the operator's position adjacent to the power machine, floor mat switching means carried by the floor mat and operable by the operator standing thereon, machine power switch carried by the machine and operably connected to the machine through the equipment switching means and the floor mat switching means whereby activation of the equipment switching means and the mat switching means is necessary before power is applied to the machine, equipment use reminder means disposed on the safety equipment holder and operably connected to the power switch through the equipment switching means, and alarm means disposed adjacent to the power machine and operably connected to the power switch through the equipment switching means and the floor mat switching means whereby upon closing the power switch, the equipment use reminder means is activated if the safety equipment has not been removed from the safety equipment holder and upon activating the floor mat switching means while said power switch is closed, the alarm switching means is activated if the safety equipment has not been removed from the safety equipment holder.

2. A safety equipment reminder system for operators of power machines as set forth in claim 1 wherein the safety equipment switching means comprises a spring loaded switch, and a switch operator arm extending outwardly from the equipment holder for attaching the safety equipment thereto whereby the attachment of the safety equipment to the said operator arm will cause the said switch to be held in an open position and whereby removal of the safety equipment from the said operator arm will cause closure of the said switch.

3. A safety equipment reminder system for operators of power machines as set forth in claim 1 wherein the floor mat switching means comprises a normally open spring loaded switch and a multiswitch relay which is operably connected to the spring loaded switch, and each switch of the multi-switch relay being operably connected to the machine power switch and the safety equipment switching means.

4. A safety equipment reminder system for operators of power machines as set forth in claim 1 wherein the equipment use reminder means comprises a lamp which is located within the safety equipment holder and display means carried by the safety equipment holder for providing visual display for the power machine operator.

5. A safety equipment reminder system for operators of power machines as set forth in claim 1 wherein the alarm means comprises an electrically operated bell.

6. A safety equipment reminder system for operators of power machines and comprising operator safety equipment holder located adjacent to the power machine, safety equipment switching means carried by the equipment holder and engageable by the safety equipment, said safety equipment switching means being actuated by the removal of the safety equipment from the equipment holder, safety floor mat located at the operator's position adjacent to the power machine, floor mat switching means carried by the floor mat and operable by the operator standing thereon, machine power switch carried by the machine and operably connected to the machine through the equipment switching means and the floor mat switching means whereby activation of the equipment switching means and the mat switching means is necessary before power is applied to the machine, equipment use reminder means disposed on the safety equipment holder and operably connected to the power switch, and alarm means disposed adjacent to the power machine and operably connected to the power switch through the equipment switching means and the floor mat switching means whereby upon closing the power switch, the equipment use reminder means is activated if the safety equipment has not been removed from the safety equipment holder and upon activating the floor mat switching means while said power switch is closed, the alarm switching means is activated if the safety equipment has not been removed from the safety equipment holder.

* * * * *